US012406536B2

(12) United States Patent
Bjorkengren

(10) Patent No.: US 12,406,536 B2
(45) Date of Patent: Sep. 2, 2025

(54) TECHNIQUES FOR EXCHANGING INFORMATION ASSOCIATED WITH VEHICLES

(71) Applicant: Geotab Inc., Oakville (CA)

(72) Inventor: Ulf Bjorkengren, Helsingör (DK)

(73) Assignee: Geotab Inc., Oakville (CA)

( * ) Notice: Subject to any disclaimer, the term of this patent is extended or adjusted under 35 U.S.C. 154(b) by 381 days.

(21) Appl. No.: 17/492,085

(22) Filed: Oct. 1, 2021

(65) Prior Publication Data

US 2022/0108565 A1 Apr. 7, 2022

Related U.S. Application Data

(60) Provisional application No. 63/086,398, filed on Oct. 1, 2020.

(51) Int. Cl.
*G07C 5/00* (2006.01)
*G07C 5/08* (2006.01)

(52) U.S. Cl.
CPC ........... *G07C 5/008* (2013.01); *G07C 5/0841* (2013.01)

(58) Field of Classification Search
CPC .... G07C 5/008; G07C 5/0841; G08G 1/0141; G08G 1/0112
See application file for complete search history.

(56) References Cited

U.S. PATENT DOCUMENTS 7,912,628 B2 * 3/2011 Chapman ............. G08G 1/0141 701/117
9,754,426 B2 9/2017 Meyer et al.
10,057,777 B2 8/2018 Li et al.
10,197,631 B2 2/2019 Barfield, Jr. et al.
10,484,848 B2 11/2019 Cavalcanti et al.
10,587,366 B2 3/2020 Chervyakov et al.
10,756,869 B2 8/2020 Khoryaev et al.
11,190,373 B1 * 11/2021 Stevenson ............ G07C 5/0841
11,328,541 B2 5/2022 Aiello et al.
11,378,625 B2 7/2022 Alleva et al.
11,431,537 B2 8/2022 Khoryaev et al.
11,432,135 B2 8/2022 Shan
11,432,220 B2 8/2022 Xu et al.
11,452,115 B2 9/2022 Khoryaev et al.
11,553,503 B2 1/2023 Parron et al.
11,595,995 B2 2/2023 Khoryaev et al.
11,601,919 B2 3/2023 Ye et al.

(Continued)

OTHER PUBLICATIONS

Hoh, Baik, et al. "Enhancing Security and Privacy in Traffic-Monitoring Systems." IEEE Pervasive Computing, vol. 5, No. 4, Oct. 2006, pp. 38-46 (Year: 2006).*

(Continued)

*Primary Examiner* — Anne Marie Antonucci
*Assistant Examiner* — Connor L Knight
(74) *Attorney, Agent, or Firm* — Wolf, Greenfield & Sacks, P.C.

(57) ABSTRACT

Described herein are techniques for addressing queries regarding vehicles without sharing of individually identifiable information regarding individual vehicles. Aggregate analysis data resulting from performance of statistical operation(s) on vehicle information regarding the individual vehicles may be used to address the queries without requiring an exchange of individually identifiable information obtained from the individual vehicles.

8 Claims, 7 Drawing Sheets

(56) References Cited

U.S. PATENT DOCUMENTS

| | | | |
|---|---|---|---|
| 11,638,227 B2 | 4/2023 | Khoryaev et al. | |
| 11,646,822 B2 | 5/2023 | Zhang et al. | |
| 11,670,116 B2 | 6/2023 | Davidson | |
| 11,671,907 B2 | 6/2023 | Kedalagudde et al. | |
| 11,710,355 B1 | 7/2023 | Wenneman et al. | |
| 11,711,176 B2 | 7/2023 | Khoryaev et al. | |
| 11,997,181 B1 | 5/2024 | Davis et al. | |
| 12,058,562 B2 | 8/2024 | Khoryaev et al. | |
| 12,063,505 B2 | 8/2024 | Guo et al. | |
| 12,063,657 B2 | 8/2024 | Panteleev et al. | |
| 12,089,278 B2 | 9/2024 | Wu et al. | |
| 12,113,746 B2 | 10/2024 | Panteleev et al. | |
| 2003/0130893 A1* | 7/2003 | Farmer | G06Q 30/0266 705/14.63 |
| 2010/0121522 A1* | 5/2010 | Wolfson | G01S 19/52 701/119 |
| 2012/0083995 A1* | 4/2012 | Vorona | G08G 1/0141 701/119 |
| 2014/0002277 A1* | 1/2014 | Fulger | H04W 4/029 340/905 |
| 2014/0244148 A1* | 8/2014 | Horvitz | G08G 1/0968 701/119 |
| 2017/0032589 A1* | 2/2017 | Zagajac | G07C 5/085 |
| 2019/0311404 A1* | 10/2019 | Wasserman | G08G 1/096716 |
| 2020/0287775 A1* | 9/2020 | Khasis | H04W 4/185 |
| 2021/0183170 A1* | 6/2021 | Rönnäng | G07C 5/0891 |
| 2021/0312724 A1* | 10/2021 | Petri | H04W 4/40 |
| 2022/0311582 A1 | 9/2022 | Ye et al. | |
| 2023/0144397 A1 | 5/2023 | Ye et al. | |
| 2023/0156792 A1 | 5/2023 | Yao et al. | |

OTHER PUBLICATIONS

Petit, Jonathan, et al. "Revisiting attacker model for smart vehicles." IEEE Xplore, Sep. 2014, pp. 1-5 (Year: 2014).*

Sheikh, Muhammad Sameer, et al. "Security and Privacy in Vehicular Ad Hoc Network and Vehicle Cloud Computing: A Survey." Wireless Communications and Mobile Computing, vol. 2020, Jan. 2020, pp. 1-25 (Year: 2020).*

Gupta, Maanak, et al. "Secure V2V and V21 Communication in Intelligent Transportation Using Cloudlets." IEEE Transactions on Services Computing, vol. 15, No. 4, Sep. 2020, pp. 1912-1925 (Year: 2020).*

* cited by examiner

TECHNIQUES FOR EXCHANGING INFORMATION ASSOCIATED WITH VEHICLES

RELATED APPLICATIONS

This Application claims the benefit under 35 USC 119(e) of U.S. Provisional Application Ser. No. 63/086,398, filed Oct. 1, 2020, entitled "TWO-STEP ANONYMIZATION." The contents of this application is incorporated herein by reference in its entirety.

BACKGROUND

Vehicles may include telemetry hardware devices that track vehicle location information during vehicle movement, and/or monitor various other vehicle parameters, such as acceleration, speed, fuel level, and airbag status.

BRIEF SUMMARY

In some embodiments, a method of addressing queries regarding vehicles without sharing of individually identifiable information regarding individual vehicles is provided. The method includes using at least one computer hardware processor to perform: receiving, from a client device, a first query requesting information regarding operation of a plurality of vehicles; communicating, to each source of a plurality of sources of vehicle information, a second query requesting information regarding one or more vehicles associated with the source of vehicle information; receiving, from each source of the plurality of sources of vehicle information, data resulting from performance of one or more first statistical operations on vehicle information regarding the one or more vehicles associated with the source, wherein at least some of the vehicle information regarding the one or more vehicles comprises telematics data obtained by the source from the one or more vehicles; generating aggregate vehicle information at least in part by performing one or more second statistical operations on the data received from each source of the plurality of sources; and outputting to the client device a response to the first query, the response comprising information based on an analysis of the aggregate vehicle information.

In some embodiments, a system for addressing queries regarding vehicles without sharing of individually identifiable information regarding individual vehicles is provided. The system includes at least one first computing device. The at least one first computing device includes at least one processor and at least one storage medium having encoded thereon executable instructions, that when executed by the at least one processor, cause the at least one processor to carry out a method. The method includes receiving, from a client device, a first query requesting information regarding operation of a plurality of vehicles; communicating, to each source of a plurality of sources of vehicle information, a second query requesting information regarding one or more vehicles associated with the source of vehicle information; receiving, from each source of the plurality of sources of vehicle information, data resulting from performance of one or more first statistical operations on vehicle information regarding the one or more vehicles associated with the source, wherein at least some of the vehicle information regarding the one or more vehicles comprises telematics data obtained by the source from the one or more vehicles; generating aggregate vehicle information at least in part by performing one or more second statistical operations on the data received from each source of the plurality of sources; and outputting to the client device a response to the first query, the response comprising information based on an analysis of the aggregate vehicle information.

In some embodiments, at least one non-transitory computer readable storage medium storing processor executable instructions that when executed by at least one processor, cause the at least one processor to perform a method is provided. The method includes receiving, from a client device, a first query requesting information regarding operation of a plurality of vehicles; communicating, to each source of a plurality of sources of vehicle information, a second query requesting information regarding one or more vehicles associated with the source of vehicle information; receiving, from each source of the plurality of sources of vehicle information, data resulting from performance of one or more first statistical operations on vehicle information regarding the one or more vehicles associated with the source, wherein at least some of the vehicle information regarding the one or more vehicles comprises telematics data obtained by the source from the one or more vehicles; generating aggregate vehicle information at least in part by performing one or more second statistical operations on the data received from each source of the plurality of sources; and outputting to the client device a response to the first query, the response comprising information based on an analysis of the aggregate vehicle information.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or near identical component that is illustrated in various figures may be represented by a like numeral. For purposes of clarity, not every component may be labeled in every drawing. In the drawings.

DETAILED DESCRIPTION

Figure 1:
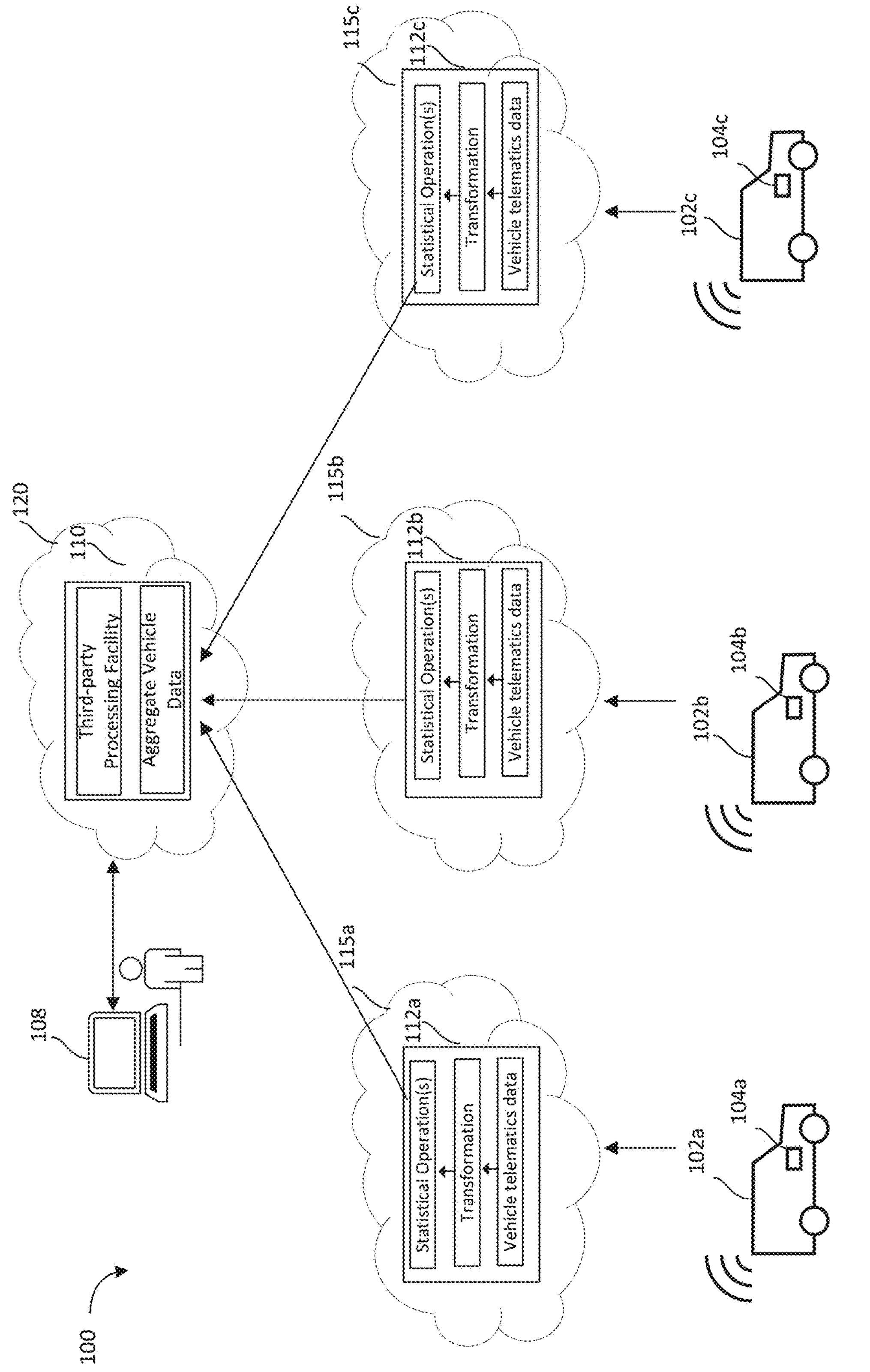
FIG. 1 is a schematic representation of one embodiment of a system for exchanging information associated with vehicles.

Described herein are examples of methods of addressing queries regarding vehicles without sharing of individually identifiable information regarding individual vehicles. In some cases, the individually identifiable information includes vehicle location data. Aggregate analysis data resulting from performance of statistical operation(s) on vehicle information regarding the individual vehicles may be used to address the queries without requiring an exchange of individually identifiable information obtained from the individual vehicles.

Various privacy regulations, such as GDPR (General Data Protection Regulation) and CCPA (California Consumer Privacy Act), set controls over collection of individually identifiable information associated with individuals and/or the sharing and processing of this information. Individually identifiable information (including personally identifiable information) may include any information that can be used to determine or infer an identity or personal characteristics of an individual. Examples of such individually identifiable information may include legal name, social security number, driver's license number, bank account number, vehicle registration plate number, behavior information, and/or other information.

Various entities may receive or obtain vehicle information regarding vehicles. Examples of such entities include, but are not limited to, vehicle owners, fleet owners (e.g., delivery companies, rental car companies, etc.), service providers (e.g., insurance companies, organizations providing subscription-based services, such as emergency services, in-vehicle security, remote diagnostics, etc.), original equipment or vehicle manufacturers, and/or other entities. These entities may be owners of vehicles and/or may be owners of data generated by or regarding such vehicles, and/or may have been granted the right by vehicle and/or data owners to receive/obtain and use vehicle information regarding vehicles. Where such an entity is not an owner of the vehicle/data, the entity may use the vehicle information for the benefit of the vehicle owner and for its own benefit, for example by processing the vehicle data to determine whether a particular vehicle will need maintenance or experience a component failure as well as by determining for a particular make/model of vehicle whether that type of vehicle tends to experience certain component failures.

Accordingly, some entities may properly possess data regarding vehicles and be entitled to process and use the information. Currently, many vehicles are configured to collect and transmit vehicle information to such entities. This information may be collected by sensors disposed in the vehicles or otherwise collected by or relating to components of the vehicles, such as through telematics devices installed in the vehicles. The information collected and transmitted may include telematics data for the vehicle. The telematics data collected (e.g., received) by telematics devices in a number of vehicles may be transmitted to the one or more entities. The telematics data that is collected and transmitted may include data generated by a number of different sensors or components of a vehicle, such as ambient temperature sensors, fuel sensors, speed sensors, navigation components, accelerometers, and so on. The telematics data may include vehicle location information (e.g., latitude and longitude information, GPS data, etc.).

The telematics data received or obtained by an entity may include individually identifiable information. For example, vehicle location information regarding a vehicle may be considered individually identifiable information. Such location information may include geographic location (e.g., latitude, longitude, altitude) at a time. This information is typically considered individually identifiable information (or personally identifiable information for a person) because by examining a vehicle's locations, an identity of the owner, operator, or occupant may be inferred. For example, the vehicle's typical overnight location and typical daytime parking location may indicate home and work addresses, which may be used to identify an individual even in a case that the individual lives and works in multi-person buildings—because there may be only one person who lives and works in those two locations. Moreover, location information over time can be used to infer personal characteristics of the vehicle owner, operator, or occupant, such as driving behavior, places the owner visits, habits (e.g., stop for coffee in the morning before work, stop at school in the afternoon before returning home, etc.), personal connections or identities of friends, businesses they patronize, etc. Such characteristics may also be individually identifiable information, and the location information that yields that information may thus be individually identifiable information. Some individuals may wish that such characteristics not be known by others, so privacy regulations and guidelines may treat location information as individually identifiable information. Such individually identifiable information may include information regarding individual vehicles and/or personally identifiable information regarding specific persons (e.g., a person associated with an individual vehicle).

It may be advantageous in some situations to aggregate vehicle telematics data for processing, and thus may be advantageous for vehicle data for a number of different vehicles to be shared with one third party. This third party may perform analysis on the received telematics data to provide insights regarding vehicle operations or behavior, which in some cases may not relate to any particular vehicle or any particular make/model of vehicle. For example, each entity may communicate vehicle location information and/or other information collected from vehicles associated with the entity to a third party and the third party may analyze the received information to provide insights, such as, behaviors of the vehicles at various locations. This could include, for example, a number of vehicles that cross a particular intersection during a certain time and, of those vehicles, what number of the vehicles braked harshly at the intersection. This could provide information regarding roadway safety or roadway design, rather than any information regarding particular vehicles. However, generating such information based on the vehicle information may necessitate receiving and processing telematics data for individual vehicles.

Because telematics data may include individually identifiable information (e.g., vehicle location information), privacy regulations may require, or privacy guidelines/preferences may suggest, that such information be anonymized or otherwise converted into non-individually-identifiable information (e.g., de-identified information) prior to being communicated to or shared with a third party such as a telematics data aggregator and processor. Anonymization or de-identification of individually identifiable information may include removing, masking or obscuring the individually identifiable information.

The inventors have recognized, however, disadvantages to performing anonymization or de-identification of individually identifiable information obtained from individual vehicles, such as of telematics data. Once anonymized/masked/obscured, certain types of individually identifiable information, for example, vehicle location information, may no longer be useful for analytical operations performed by a telematics data aggregator and processor. For instance, vehicle location information can be used to provide insights into vehicle behavior because vehicle location information, such as latitude and longitude data, binds a vehicle to a particular point in space and time, such as a particular latitude and longitude at a particular time. Masking of vehicle location information often means changing the latitude/longitude values to some other set of values corresponding to a different location or making the location less precise by merely indicating that the real location was somewhere within a larger geographic zone. Such anonymization or masking results in the loss of the binding of the data to the particular location and hence the masked data cannot be used to provide or is less useful for providing valuable insights regarding vehicle behavior at the particular location or at different locations over time.

Accordingly, with conventional techniques, processing of telematics data is handicapped: Either some processing simply cannot be done because the data cannot be shared with the third party that is to do the processing, or the telematics data must be anonymized in a way that reduces or eliminates the utility of the information.

To address these disadvantages, the inventors have developed techniques for exchanging information between entities and third parties without communicating and/or without anonymizing the individually identifiable information obtained from individual vehicles as in conventional techniques. The inventors have recognized that aggregate analysis data resulting from performance of statistical operation(s) on vehicle information regarding multiple vehicles cannot be used to infer the identity or personal characteristics of any particular vehicle or vehicle owner, operator, or occupant. Some techniques described herein include performing such statistical operations on vehicle information for individual vehicles without transmitting that individual vehicle information to a telematics data aggregator and processor or third party, while still allowing for aggregate information for a set of vehicles to be generated based on such individual vehicle information. This may allow for data analysis while accommodating privacy regulations or privacy guidelines.

In some embodiments, techniques described herein may be performed by a data aggregation and analysis system that does not receive or process individually identifiable information. Such techniques may involve the system receiving (e.g., by a telematics data aggregator and processor) a query requesting information regarding operation of a plurality of vehicles, for example, a number of vehicles across various entities, such as, various vehicle fleet owners. As one illustrative example, the system may receive such a query (from a client computing device) that requests information regarding an average speed of vehicles that crossed a particular roadway intersection, which may be submitted by a party looking to study, for example, safety of the particular intersection. In some embodiments, the method may include communicating, to each source of a plurality of sources of vehicle information, a query requesting information regarding one or more vehicles associated with the source of vehicle information. Each source of vehicle information may correspond to an entity, which may be a vehicle fleet owner (and be associated with multiple vehicles of the fleet) or may be another entity associated with multiple vehicles. The query that the system sends to each vehicle fleet owner (or other entity) may request information regarding vehicle(s) owned by the fleet owner, such as by requesting the information regarding speed of vehicles crossing the specified intersection (to continue the example identified above). Accordingly, in response to receiving the originally-received query from the client computing device, the system may generate a number of queries to be communicated to individual vehicle fleet owners or other entities.

In some embodiments, the system may then receive, from each source of the multiple sources of vehicle information, data resulting from performance of statistical operations (e.g., summing operations, averaging operations, etc.) on vehicle information regarding the vehicle(s) associated with the source, in accordance with the query received by the source. Each source (e.g., vehicle fleet owner) may perform the statistical operation(s) on vehicle information regarding vehicle(s) associated with the source, and may then communicate the resulting data to the system. In some embodiments, at least some of the vehicle information regarding the vehicle(s) may include telematics data obtained by the source from the vehicle(s), and the telematics data may include individually identifiable information. For example, the data may include location information for particular vehicles over time. Once the statistical operations are completed, the system may receive, from each vehicle information source, data resulting from performance of the statistical operation(s) on the data associated with the multiple vehicle(s). By having the individually identifiable information processed by the disparate sources of vehicle information in response to providing the query to them, and then having aggregate information sent to the system by the disparate sources, the system can start to compile an answer to the initial query that was received without itself receiving individually identifiable information for the vehicles. To continue the average-speed-in-intersection example given above, each source of vehicle information may itself identify (from the individually identifiable information it properly possesses) for the vehicles with which it is associated, what vehicles traversed the intersection and the average speed at which they traversed the intersection. Each vehicle information source may generate such average information for the vehicles with which they are associated, and the multiple different averages may then be sent to the system for further processing.

In some embodiments, the system may then generate aggregate vehicle information at least in part by performing more statistical operations (e.g., summing operations, averaging operations, etc.) on the data received from each source of the multiple sources. For example, the system may generate aggregate vehicle information by performing statistical(s) operations on the data received from each source (e.g., vehicle fleet owner). This could include combining the average speed information from each source, using the average speed and a count of vehicles associated with each source, to determine an overall average speed for all vehicles that are known by at least one vehicle information source to have traversed the intersection. In some embodiments, the method may include outputting to the client computing device a response to the originally-received query, the response comprising information based on an analysis of the aggregate vehicle information. For example, the system may, based on the analysis of the aggregate vehicle information, generate a response to the query which includes information regarding the average speed of vehicles that crossed the particular intersection.

The inventors have further recognized that data resulting from performance of statistical operation(s) on vehicle information regarding vehicles associated with a vehicle fleet owner may, in some circumstances, still be used to infer the identity or personal characteristics of vehicle owners, for example, when the number of vehicles in the fleet is below a predetermined threshold number. For example, when the number of vehicles is below a minimum threshold (N<min) (where such threshold may vary between data sets), individually identifiable information associated with these vehicles may be ascertained even though statistical operation(s) are performed on the vehicle information regarding these vehicles.

To mitigate this risk, the inventors have additionally developed techniques that allow a first vehicle information source (e.g., vehicle fleet owner) with a number of vehicles below a minimum threshold to communicate data resulting from performance of statistical operation(s) on vehicle information associated with the first source to a second vehicle information source, which may have a number of vehicles above or below the minimum threshold. In this scenario, the first vehicle information source does not communicate its data to the system directly. Instead, the second vehicle information source aggregates its data with the data from the first source and thereby may generate a data set where the number of vehicles is more than the threshold. The second source then communicates combined data from the first and second sources to the system. (If the data set for two sources is still below the threshold or otherwise small enough to present an undesired level of risk, a third or more information sources could be similarly included in the process, as discussed below.) This technique may mitigate the risk that individually identifiable information could be ascertained from shared aggregated data.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of a system 100 for exchanging information associated with vehicles. The system may include multiple vehicles such as vehicles 102*a*, 102*b*, 102*c*. Each vehicle 102 may be associated with a telematics device 104 (e.g., vehicle 102*a* is associated with telematics device 104*a*). The telematics device may be configured to monitor operation of a vehicle to which it is connected and to communicate data to a remote site. A telematics device may be removably installed in and/or integral to a vehicle, as the present disclosure is not limited in this regard. Each telematics device 104 is configured to collect (or otherwise receive) telematics data and to transmit telematics data to one or more destinations, such as vehicle information sources 115*a*, 115*b*, 115*c*. Telematics data may be or include data collected, received, analyzed, processed, communicated, or transmitted by a telematics device. Telematics data may include data relating to a vehicle 102 or operation of a vehicle 102. A telematics device may receive the telematics data through a communications port with the vehicle, such as through an on-board diagnostics (OBD) port. Telematics data may include data not typically broadcast on a controller area network (CAN) bus. While telematics data may be associated with a telematics device connected to, installed in, or integrated with a vehicle, telematics data may additionally or alternatively be associated with one or more other devices. For example, telematics data relating to a vehicle or operation of a vehicle may be collected, received, and/or transmitted using an application on a smartphone. For example, telematics data related to vehicle location may be associated with location information from a smartphone. As another example, harsh acceleration of a vehicle may be ascertained using data from one or more accelerometers of a smartphone.

As used herein, "telematics data" may refer to raw or original data received from a telematics device associated with the vehicle, such as, accelerometer data received from accelerometer(s) installed in the vehicle or speed data received from speed sensor(s) installed in the vehicle and/or processed data resulting from processing of the raw or original data, such as average deceleration obtained by processing the accelerometer data or average speed obtained by processing the speed data. In some embodiments, such processing may be performed by computing devices at the vehicle information sources 115, such as server computing device 112.

The telematics device 104 of FIG. 1 may include suitable hardware and/or software configured to collect, sense, receive, process, store, and/or transmit any appropriate telematics data associated with a vehicle. A telematics device 104 may be integrated into the vehicle or may be removably connected to a vehicle, such as through a diagnostic port (e.g., an on-board diagnostics (OBD) or OBD-II port). In some embodiments, telematics device 104 may include a hand-held device, which may include a mobile device such as a cellular telephone or smartphone. The telematics device 104 may communicate with one or more components of the vehicle 102 or otherwise receive from the vehicle 102 telematics data related to the vehicle 102. The telematics device 104 may be configured to connect to a vehicle through an OBD II port or a CAN bus port, or may be integrated into a vehicle's central control system. The telematics device 104 may then transmit the telematics data from the device 104 and vehicle 102, to a destination remote from the vehicle 102. It should be appreciated that the term "telematics device" may refer to hardware and/or software, as the present disclosure is not limited in this regard.

In some embodiments, vehicle 102 may be configured to collect and transmit information collected by sensors disposed in the vehicles 102 or otherwise collected by or relating to components of the vehicles 102, such as through telematics devices 104 installed in the vehicles 102. The information collected and transmitted may include telematics data for the vehicle. In some embodiments, the telematics data may include location data (e.g., GPS data) and/or time data. The telematics data may include other information in addition to location and/or time data, for example, data collected from speed sensors and accelerometers installed in the vehicle.

In some embodiments, vehicles 102 may transmit telematics data, which may include location data (e.g., GPS data) and/or time data. The telematics data may be analyzed to segment the data based on the geographic area in which the vehicle was located when the data was collected (e.g., based on the location data), and/or the time period during which the data was collected (e.g., based on the time data). As such, telematics data may be associated with a road and/or a road segment (e.g., a roadway intersection) on which the vehicle was driving during a time period when the telematics data was collected. As used herein, a road may be understood as a public or private right of way on which a vehicle operates, and a road segment may be understood to be a portion of a road. As also described above, telematics data may include other information in addition to location and/or time data.

In some embodiments, a telematics device 104 may be configured to transmit the telematics data to one or more destinations, such as vehicle information sources 115*a*, 115*b*, 115*c*. For example, telematics device 104*a* may transmit telematics data associated with vehicle 102*a* to source 115*a*, telematics device 104*b* may transmit telematics data associated with vehicle 102*b* to source 115*b*, and telematics device 104*c* may transmit telematics data associated with vehicle 102*c* to source 115*c*. While FIG. 1 depicts one vehicle/telematics device communicating telematics data to each source, it will be understood that multiple vehicles including corresponding telematics devices may be associated with each source such that telematics data associated with a number of vehicles may be communicated to each source. Also, while FIG. 1 depicts three vehicle information sources, fewer or more vehicle information sources may be included in the system without departing from the scope of this disclosure.

Vehicle information sources 115*a*, 115*b*, 115*c* may receive or obtain telematics data regarding vehicles. Examples of such sources include, but are not limited to, vehicle owners, fleet owners (e.g., delivery companies, rental car companies, etc.), service providers (e.g., insurance companies, organizations providing subscription-based services, such as emergency services, in-vehicle security, remote diagnostics, etc.), original equipment or vehicle manufacturers, and/or other entities. These sources may be owners of vehicles and/or may be owners of data generated by or regarding such vehicles, and/or may have been granted the right (e.g., by contract) by vehicle and/or data owners to receive/obtain and use vehicle information regarding vehicles. The right to receive that vehicle information may be accompanied by obligations not to distribute individually identifiable vehicle information to others. That obligation may have been imposed by a contract or other agreement, privacy regulations, privacy guidelines, or otherwise.

As an example, each source 115*a*, 115*b*, 115*c* may correspond to a vehicle manufacturer that has sold a number of vehicles to vehicle owners and, following the sale, receives telematics data from the vehicles. The telematics data may be received as part of a service performed for the vehicle owners, such as by monitoring maintenance condition of components, or may have been received for another reason. Each source 115*a*, 115*b*, 115*c* may include a server computing device 112, such as server computing device 112*a*, 112*b*, 112*c*, respectively, that is configured to perform various operations on telematics data received from vehicles associated with the source. While for ease of illustration, one server computing device 112 is shown, it should be appreciated that server computing device 112 may be implemented as one or more servers, including a distributed system of servers that operate together, such as a cloud service. Such server(s) may be implemented as any suitable form of computing hardware, as embodiments are not limited in this respect. The server computing device 112 may include software such as an entity processing facility (not shown) that carries out at least some of the techniques described herein. It should be appreciated that an entity processing facility need not be associated with a server computing device, but rather that an entity processing facility may be executed on any suitable hardware, as the present disclosure is not limited in this respect. In some embodiments, server computing device 112 may be communicably coupled to a database (not shown) that may store the telematics data (raw or processed) associated with the vehicles over time.

In some embodiments, each server computing device 112 may receive vehicle telematics data from a number of vehicles owned by or otherwise associated with a corresponding source 115, such as a vehicle manufacturer. In some embodiments, the telematics data as received at each source may include different information and/or be in a different format. For example, the telematics data as received at one source may include proprietary data associated with that source (e.g., that vehicle manufacturer), or data in a proprietary format specific to that source. Server computing device 112 may therefore perform one or more transformation operations on the received telematics data in some such embodiments. The transformation operation(s) may be performed to increase consistency in vehicle data (associated with each source) that is represented using a common data model and/or common database design. The transformation operation(s) may include normalizing the vehicle data associated with different sources such that data unit(s) used to represent the vehicle data from the different sources is the same (i.e., represented using a common data model). The transformation operation(s) may include storing data sets associated with the different sources using the same database schema, structure, and/or design. Such transformation(s) may enable the same queries to be run on vehicle data associated with different sources and/or the same statistical operation(s) to be performed on vehicle data associated with different sources (e.g., different vehicle manufacturers), such as by utilizing a same statistical operations tool across the server computing devices 112 associated with the different sources.

In some embodiments, in response to a query from the telematics data aggregator and processor 120, server computing device 112 may process the query to identify vehicle information that is responsive to the query and then perform one or more statistical operations on the received vehicle data. In some embodiments, the server computing device 112 may process the query using vehicle information (current and/or historical) stored in the database. In one embodiment, the statistical operations may be performed on transformed vehicle data. The statistical operations may include, but not be limited to, summing operations, averaging operations, and/or other statistical operations. In some embodiments, data resulting from the performance of the statistical operations may be communicated by each vehicle manufacturer 115 to a telematics data aggregator and processor 120.

In some embodiments, the telematics data aggregator and processor 120 may include a server computing device 110 that is configured to perform various operations on data received from one or more sources 115. While for ease of illustration, one server computing device 110 is shown, it should be appreciated that server computing device 110 may be implemented as one or more servers, including a distributed system of servers that operate together, such as a cloud service. Such server(s) may be implemented as any suitable form of computing hardware, as embodiments are not limited in this respect. The server computing device 110 may include software such as a third-party processing facility that carries out at least some of the techniques described herein. It should be appreciated that a third-party processing facility need not be associated with a server, but rather that a third-party processing facility may be executed on any suitable hardware, as the present disclosure is not limited in this respect.

According to some embodiments, server computing device 110 may receive, from each source 115/server computing device 112, data resulting from performance of statistical operations on vehicle data associated with the source. Server computing device 110 may generate aggregate vehicle information at least in part by performing additional statistical operations on the data received from each source 115. The additional statistical operations may include, but not be limited to, summing operations, averaging operations, and/or other statistical operations that is performed on the received data (which itself may have resulted from statistical operations, as discussed above). In some embodiments, server computing device 110 may analyze the aggregate vehicle information to generate insights regarding vehicle operations or behavior. For example, server computing device 110 may receive a query, from a client computing device 108, requesting information regarding operation of a number of vehicles. Server computing device 110 may analyze the aggregate vehicle information to generate a response to the query and output the response to the client computing device 108.

In some embodiments, client computing device 108 may include a mobile computing device, such as a mobile smartphone, tablet computer, a laptop computer or other mobile computing device that may be used to interact with the server computing device 110. In some embodiments, client computing device 108 may be a fixed electronic device such as a desktop computer, a rack-mounted computer, or any other suitable fixed electronic device that may be used to interact with the server computing device 110. In some embodiments, client computing device 108 may communicate with the server computing device 110 via a network (such as a local area network, a wide area network, a corporate intranet, the Internet, and/or any other suitable network) using wired, wireless, and/or any other suitable type of connections, as aspects of the disclosure provided herein are not limited in this respect. Also, while FIG. 1 depicts a single client computing device 108, the system may include multiple client computing devices configured to interact with the server computing device 110, as aspects of the disclosure provided herein are not limited in this respect.

Figure 2:
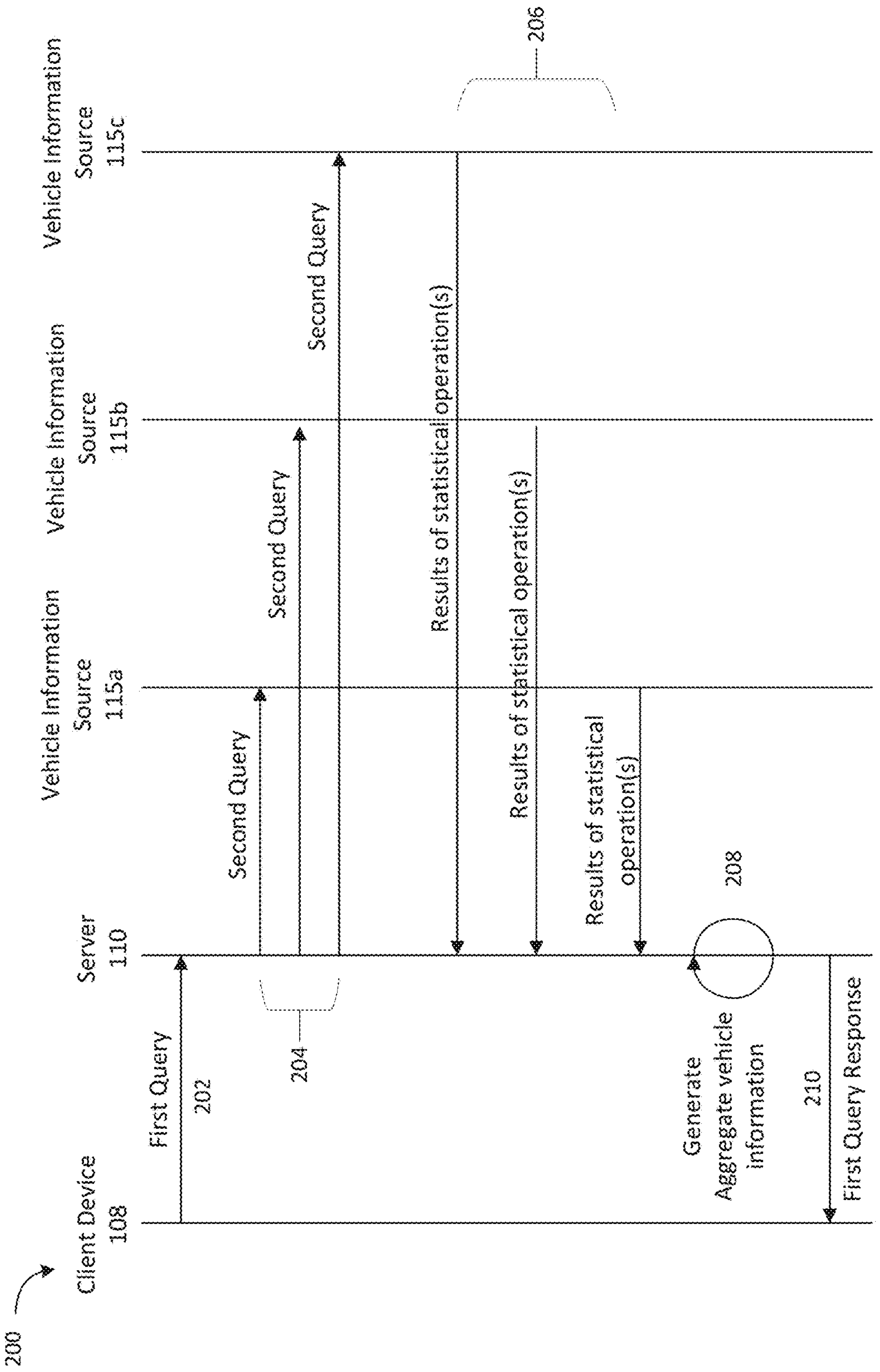
FIG. 2 is a flow diagram of an example process for addressing queries regarding vehicles without sharing of individually identifiable information regarding individual vehicles, in accordance with some embodiments of the technology described herein.

FIG. 2 is a flow diagram of an example process 200 for addressing queries regarding vehicles without sharing of individually identifiable information regarding individual vehicles, in accordance with some embodiments of the technology described herein. In act 202, server computing device 110 may receive a first query from a client computing device 108. The first query may request information regarding operation of a number of vehicles. The vehicles to which the query is relevant may be those that are associated with multiple sources of vehicle information. Such sources of vehicle information may include, for example, vehicle manufacturers that receive information from vehicles that are manufactured and sold by those manufacturers. To continue an example given above (that, it should be appreciated, is merely illustrative), the first query may request information regarding an average speed of vehicles that crossed a particular intersection. The first query may include the location information (e.g., latitude and longitude information) of the intersection and the request for the average speed.

In response, the server computing device 110 starts soliciting information to address the received query. As should be appreciated from the foregoing, the device 110 does not itself possess or have direct access to individually identifiable information that may be needed to address the query. In the intersection-speed example, the device 110 does not have access to location information that could be used to identify vehicles that traversed the intersection, since such location information would be individually identifiable information. Accordingly, the device 110 communicates with the sources 115 to request that they process the individually identifiable information themselves (since they properly have access to that information) and provide aggregate information to the device 110 to address the query, without transmitting to the device 110 the individually identifiable information.

In act 204, server computing device 110 may generate and communicate a second query to each vehicle information source 115*a*, 115*b*, 115*c*. Each second query may request an individual vehicle information source to provide information regarding a set of vehicles associated with the source, where that information is related to the topic of the first query. The information included in the second query may identify conditions that a vehicle is to meet to be included in the responsive data set, the type of information sought about those vehicles, and one or more values of interest for that type of information. In the intersection-speed example, the second query may include the location information of the intersection and may indicate that vehicle speed information is sought, and may in particular request information regarding an average speed of vehicles associated with the source that crossed the intersection. In indicating the values of interest in a query, a particular statistical operation to be performed on the sought information to generate the values may be specified (e.g., by specifying an average, or other operation). In some embodiments, each vehicle information source 115 may generate a response to the second query. The response may include information based on an analysis of vehicle information (e.g., location data, speed data) regarding vehicles owned by the source.

In some embodiments, a vehicle information source 115 may use the location information of the vehicle(s) owned by the source and the location information of the intersection to identify from vehicle information it stores or to which it otherwise has access a set of vehicles that crossed the intersection. The vehicle information source 115 may then determine, based on an analysis of telematics data stored for the identified vehicles (e.g., data obtained from speed sensors and shared with the vehicle information source 115), the average speed of each identified vehicle as it crossed the intersection.

In some embodiments, the response (to the second query) generated by each vehicle information source 115 may include the average speed information regarding the set of vehicles associated with the source that were determined to have crossed the intersection.

In some embodiments, each vehicle information source 115 may perform one or more first statistical operations on vehicle information regarding vehicles associated with the source. According to some aspects, the one or more first statistical operations may be performed on vehicle information included in the response to the corresponding second query. For example, a response to a second query may include a value indicating a number of vehicles in the set that crossed the particular intersection and the average speed of each of those vehicles. In some embodiments, the one or more first statistical operations (e.g., summing operations) may be performed on the vehicle speed data (e.g., average speed). In some embodiments, the average speed for each of the vehicles in the set may be summed to yield summed data.

In act 206, server computing device 110 may receive, from each vehicle information source 115, data resulting from performance of the one or more first statistical operations at the respective source. In some embodiments, the one or more first statistical operations may include summing operations and the server computing device 110 may receive, from each vehicle information source 115, summed data resulting from performance of summing operations on the respective vehicle data (e.g., average speed). In some embodiments, the server computing device 110 may receive, from each vehicle information source 115, the corresponding summed data and the corresponding value indicating the number of vehicles in the set that crossed the particular intersection.

In act 208, server computing device 110 may generate aggregate vehicle information at least in part by performing one or more second statistical operations (e.g., summing operations, averaging operations, etc.) on the data received from each vehicle information source 115. In some embodiments, server computing device 110 may perform a summing operation on the data received from each vehicle information source. In some embodiments, server 110 may perform a first summing operation on the summed data received from each vehicle information source and a second summing operation on the values (indicating the number of vehicles) received from each vehicle information source. In some embodiments, the server computing device 110 may perform an averaging operation using the results of the first summing operation and the second summing operation. In some embodiments, the server computing device 110 may perform an averaging operation using the results of the first summing operation and the second summing operation to generate an overall average over the data from all vehicle information sources. Other aggregation operations may be performed in other embodiments, as embodiments are not limited to performing any particular mathematical operation.

In act 210, server computing device 110 may generate a response to the first query based on analysis of the aggregate vehicle information. The server may output the response to the first query to client computing device 108. In some embodiments, the response may include information regarding the average speed of vehicles (across different sources) that crossed the particular intersection.

In some embodiments, per privacy regulations or privacy guidelines, the telematics data aggregator and processor 120/server computing device 110 is not authorized to receive individually identifiable information regarding individual vehicles. To ensure that these privacy regulations or privacy guidelines are not breached, sources 115 may perform one or more first statistical operations on vehicle telematics data received from individual vehicles and transmit the resulting data to the telematics data aggregator and processor 120 without transmitting individually identifiable information (e.g., vehicle location data). While telematics data received by a source 115 may include individually identifiable information associated with individual vehicles, the data resulting from performance of the first statistical operations on at least some of the telematics data (e.g., speed data) cannot be used to infer individually identifiable information regarding the individual vehicles. Nonetheless, the resulting data can be used to generate aggregate information for a set of vehicles based on such individual vehicle information.

In some embodiments, the act 208 of generating aggregate vehicle information may involve multiple information exchanges between the vehicle information sources 115 and the server computing device 110. Multiple information exchanges may be performed to generate aggregate information that would be responsive to the query initially received in act 202. For example, in some situations, an analysis of individually identifiable information at each source 115 may benefit from having some aggregate-level information across each of the sources. Such a situation may include when standard deviation information is requested. As is known, the standard deviation calculation involves comparison of individual values to an average of the values. To calculate a standard deviation in a distributed environment such as that shown in FIG. 1, the average may first be generated at the server 110 from an initial round of responses from the sources 115. Then, since the average needs to be compared to individual values and the server 110 does not have access to the individual values, the average is sent to each source for a second round of analysis and production of a second round of responses. Accordingly, in some embodiments, the act 208 may involve communicating the aggregated vehicle information (e.g., the overall average) to each vehicle information source.

In some embodiments, the act 208 may involve receiving, from each vehicle information source, data resulting from performance of one or more third statistical operations on the vehicle information (e.g., average speed information) regarding the vehicle(s) associated with the source and the aggregate vehicle information (e.g., the overall average). For example, the one or more third statistical operations performed by each vehicle information source may include subtracting the overall average from the average speed associated with each vehicle in the set and squaring the result of each subtracting operation. The one or more third statistical operations may include performing a summing operation on the squared values. In some embodiments, the results of the summing operation on the squared values may be communicated by each vehicle information source to the server computing device 110.

In some embodiments, the act 208 may involve generating additional aggregate vehicle information at least in part by performing one or more fourth statistical operations on the data received from each vehicle information source. In some embodiments, server computing device 110 may generate additional aggregate information by performing (i) a summing operation on the data (e.g., the results of the summing operation on the squared values) received from each vehicle information source, (ii) performing a dividing operation on the result of the summing operation in (i) with the sum of the values (indicating the number of vehicles) received from each vehicle information source, and (iii) performing a square root operation on the result of the dividing operation.

In some embodiments, in act 210, server computing device 110 may generate a response to the first query based on analysis of the additional aggregate vehicle information. Server computing device 110 may output to the client computing device 108, a response to the first query, the response comprising information based on an analysis of the additional aggregate vehicle information.

One example of the exchange between vehicle information sources 115 and server computing device 110 includes the following steps, in the intersection-speed example given above: (i) server computing device 110 communicates a second query to all vehicle information sources 115, prompting for average speed at which vehicles traversed the identified intersection; (ii) vehicle information sources 115 evaluate their respective sets of vehicle data that match the second query, where the sets of vehicle data were previously obtained and stored or are obtained in response to the query, to identify vehicles that traversed the intersection and a speed at which they crossed the intersection; (iii) vehicle information sources 115 calculate number of vehicles N that crossed the intersection and the average speed of their respective data sets; (iv) vehicle information sources 115 communicate the average speed and N to the server computing device 110; (v) server computing device 110 calculates the average of the averages received from the sources, using the Ns that indicate the number of vehicles covered by each individual average, thereby generating an overall average over the data from all sources. In an example in which the standard deviation of vehicle speed is additionally (or alternatively) sought, the example could further include: (vi) server computing device 110 communicates the overall average to all sources; (vii) vehicle information sources 115 calculate the sum of the squares of each speed in the data set from (ii), minus the overall average received in (vi); (viii)

vehicle information sources 115 communicate the sum calculated in (vii) to the server computing device 110; (xi) server computing device 110 calculates the sum of the received sums, divides the resulting sum with the sum of Ns, and takes the square root of result of the division. Performance of these steps results in generation of additional aggregate vehicle information (e.g., standard deviation) represented by the formula below:

$$\sigma = \sqrt{\frac{1}{N}\sum_{i=1}^{N}(x_i - \mu)^2}, \text{ where } \mu = \frac{1}{N}\sum_{i=1}^{N} x^i \quad (1)$$

Figure 3:
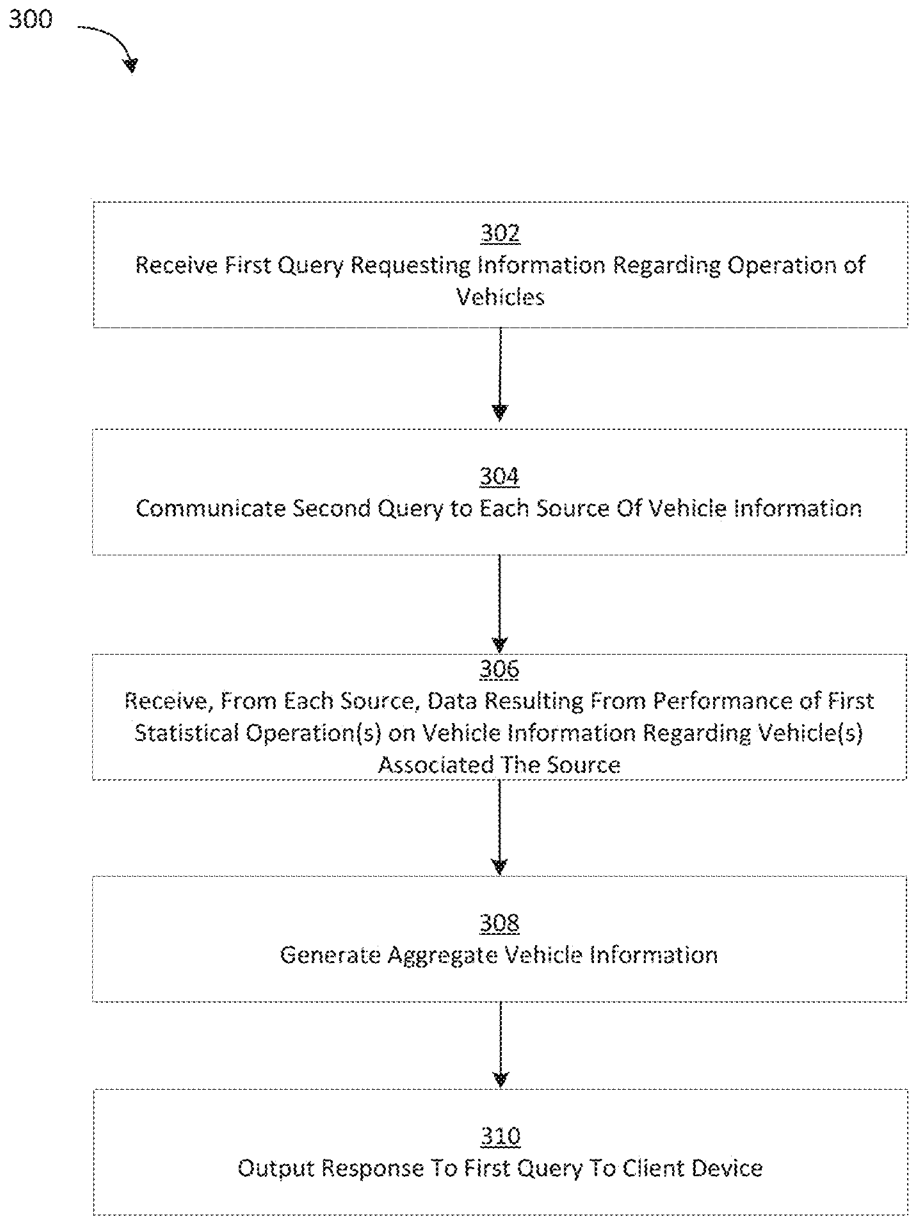
FIG. 3 is a flowchart of an example process for addressing queries regarding vehicles without sharing of individually identifiable information regarding individual vehicles, in accordance with some embodiments of the technology described herein.

FIG. 3 is a flowchart of an example process 300 for addressing queries regarding vehicles without sharing of individually identifiable information regarding individual vehicles, in accordance with some embodiments of the technology described herein. The process 300 may be performed using a computing device such as server computing device 110 of telematics data aggregator and processor 120 described above with reference to FIGS. 1 and 2. As shown in FIG. 3, process 300 comprises an act 302 of receiving, from a client computing device (e.g., client computing device 108), a first query requesting information regarding operation of a plurality of vehicles. This process may be described below in connection with a query example in which the first query requests information regarding vehicles that braked harshly at a particular intersection. The first query may include the location information (e.g., latitude and longitude information) of the intersection and identify the information of interest, harsh braking. The query may additionally request an average deceleration of the vehicles, which may provide information on a degree of harsh braking. Such information about harsh braking at an intersection may be wanted as part of a study of intersection safety, which might lead to adjustments to try to limit the amount of harsh braking, such as improving visibility, lengthening the amount of time of a yellow light, or other options.

In some embodiments, process 300 may include an act 304 of communicating, to each source of a plurality of sources of vehicle information (e.g., vehicle information sources 115*a*, 115*b*, 115*c*), a second query requesting information regarding one or more vehicles associated with the source of vehicle information. Each second query may request an individual vehicle information source to provide information regarding a set of vehicles associated with the source. For example, the second query may include the location information of the intersection and may request information regarding acceleration of vehicles associated with the source that crossed the intersection. In some embodiments, the second query may request an average rate of deceleration associated with each vehicle at the location specified for the intersection.

In some embodiments, a vehicle information source 115 may use the location information of the vehicle(s) owned by the source and the location information of the intersection to identify a set of vehicles that crossed the intersection. The vehicle information source 115 may also determine, based on an analysis telematics data (e.g., data obtained from accelerometers), the rate of deceleration of each identified vehicle as it crossed the intersection and, from those rates of deceleration, an average rate of deceleration.

In some embodiments, a response to the second query generated by each vehicle information source 115 may include the average deceleration rate information regarding the set of vehicles associated with the source.

In some embodiments, each vehicle information source 115 may perform one or more first statistical operations on vehicle information regarding vehicle(s) associated with the source. According to some aspects, the one or more first statistical operations may be performed on vehicle information included in the response to the corresponding second query. For example, a response to a second query may include a value indicating a number of vehicles in the set that crossed the particular intersection and the deceleration rate of each of those vehicles. In some embodiments, the one or more first statistical operations (e.g., summing operations, averaging operations) may be performed on the vehicle data (e.g., deceleration rate). In some embodiments, the deceleration rate for vehicles in the set may be averaged to yield mean data.

In some embodiments, process 300 may include an act 306 of receiving, from each source of the plurality of sources of vehicle information, data resulting from performance of one or more first statistical operations on the vehicle information regarding the vehicle(s) associated with the source. In some embodiments, the one or more first statistical operations may include averaging operations and the act 306 may include receiving, from each vehicle information source 112, mean data resulting from performance of summing operations on the respective vehicle data (e.g., deceleration rate). In some embodiments, the act 306 may include receiving, from each vehicle information source 112, the corresponding mean data and the corresponding value indicating the number of vehicles in the set that crossed the particular intersection.

In some embodiments, process 300 may include an act 308 of generating aggregate vehicle information at least in part by performing one or more second statistical operations (e.g., summing operations, averaging operations, etc.) on the data received from each source of the plurality of sources. In some embodiments, the act 308 may include performing a averaging operation on the data received from each vehicle information source. In some embodiments, the act 308 may include performing an averaging operation on the mean data received from each vehicle information source, using a result of a second summing operation on the values (indicating the number of vehicles) received from each vehicle information source.

In some embodiments, process 300 may include an act 310 of outputting to the client device (e.g., client computing device 108) a response to the first query, the response comprising information based on an analysis of the aggregate vehicle information. In some embodiments, the response may include information regarding the rate of deceleration of vehicles (across different sources) that crossed the particular intersection. In some embodiments, the act 310 may include determining, based on the aggregate deceleration rate information, a number of vehicles that braked harshly (e.g., with deceleration rate larger than a particular threshold rate) at the particular intersection. In some embodiments, such information may be used for traffic analysis, determining intersection safety, and communicating to appropriate authorities so that changes can be made to improve the intersection safety (such as, by increasing the time for which the traffic light remains yellow).

Figure 4A:
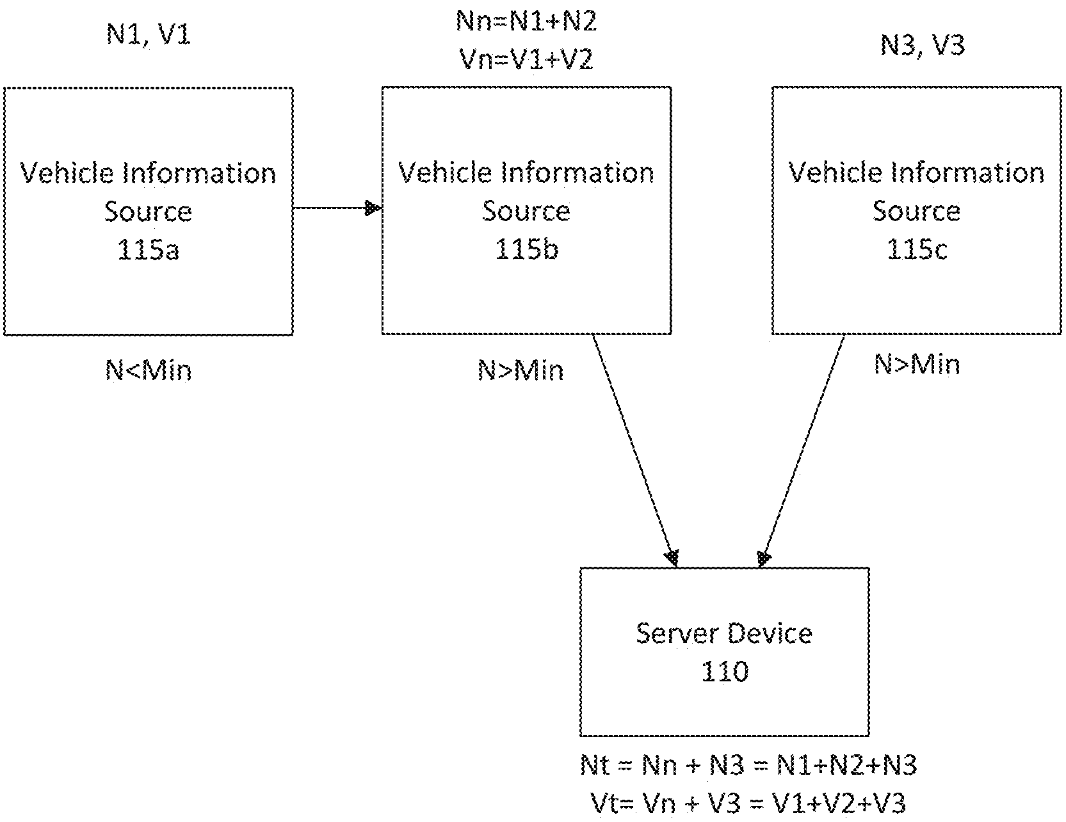
FIGS. 4A-4C depict various scenarios for exchanging information between sources of vehicle information and a server device, in accordance with some embodiments of the technology described herein.
Figure 4B:
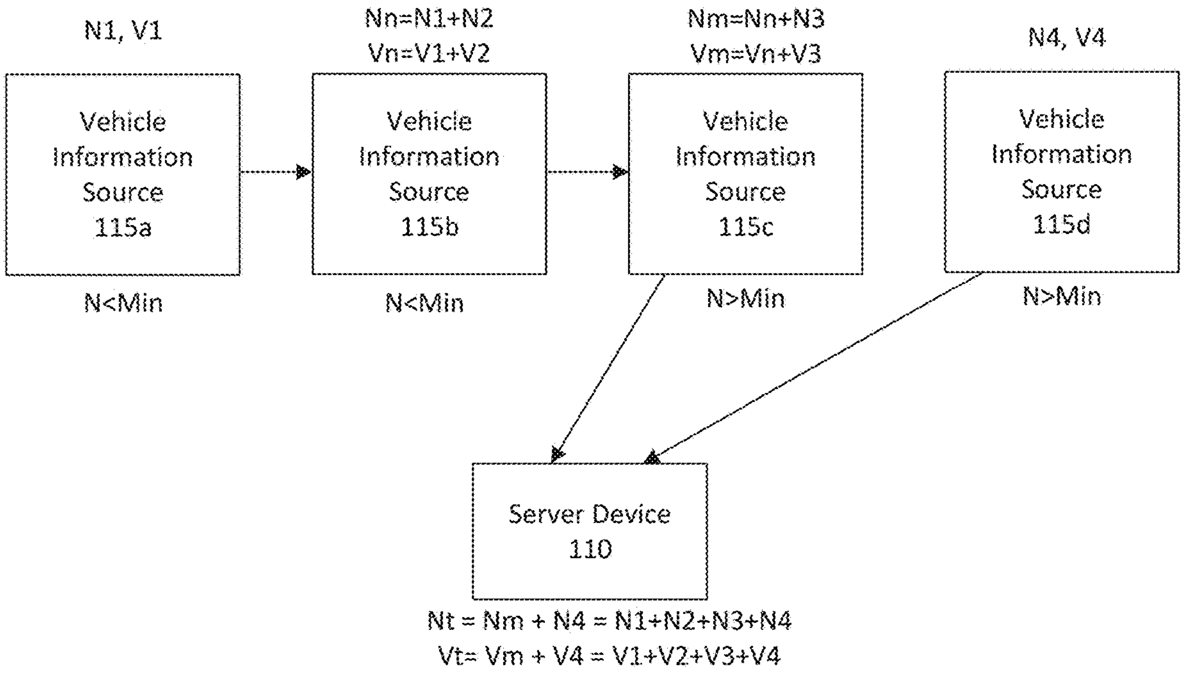
Figure 4C:
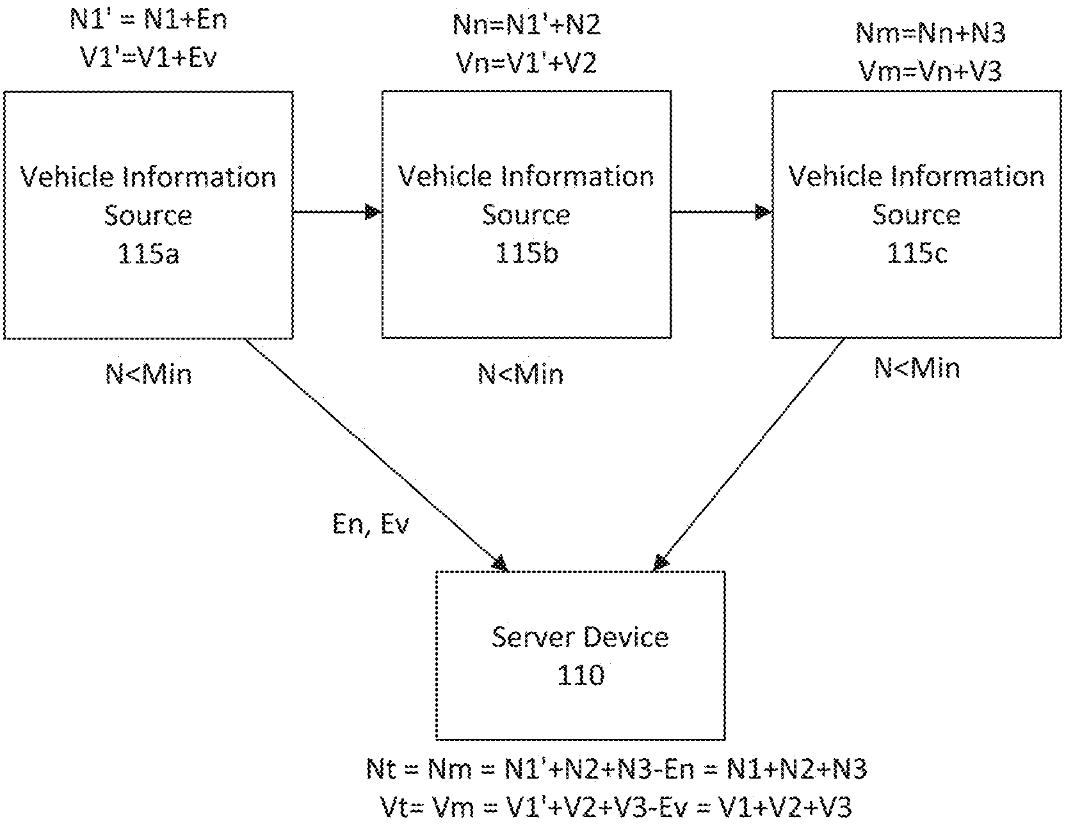

FIGS. 4A-4C depict various scenarios for exchanging information between the vehicle information sources and a server computing device, in accordance with some embodiments of the technology described herein. As described above, there may be instances where a number of vehicles associated with a vehicle information source 115 may be below a minimum threshold such that individually identifiable information associated with these vehicles may be ascertainable even though only aggregate information resulting from performing statistical operation(s) on the individual vehicle information is exchanged. For example, if a source of vehicle information is a vehicle manufacturer, and the vehicle manufacturer reports that only one or two vehicles of its brand is within a geographic area of interest for a query, all information resulting from that query may be ascertainable as related to the one or two people who own/operate those vehicles.

As shown in FIG. 4A, a number of vehicles associated with vehicle information source 115*a* may be below the minimum threshold and the number of vehicles associated with vehicle information sources 115*b* and 115*c* may be above the minimum threshold. In some embodiments, the minimum threshold may be three vehicles, four vehicles, or five vehicles. Other values for the minimum threshold may be set without departing from the scope of this disclosure.

To address this scenario, vehicle information source 115*a* may communicate data resulting from performance of first statistical operation(s) on vehicle information associated with the vehicle information source 115*a* to vehicle information source 115*b*. For example, as shown in FIG. 4A, the number of vehicles (N1) associated with source 115*a* that satisfy a second query (e.g., number of vehicles that crossed a particular intersection) and averaged data (V1) resulting from performance of averaging operations on the vehicle data (e.g., speed) associated with the vehicles may be communicated to the vehicle information source 115*b*. Vehicle information source 115*b* may combine the information received from vehicle information source 115*a* with its own information (N2, V2) and communicate the combined information (Nn, Vn) to the server computing device 110. In some embodiments, the vehicle information source 115*a* may be preconfigured to communicate the data to the vehicle information source 115*b* when the minimum threshold for source 115*a* is not met or in response receiving a request from the server computing device 110 to send the data to source 115*b* along with a notification to communicate the combined data, for example, in response to a query.

Vehicle information source 115*c* may communicate its information (N3, V3) directly to the server computing device 110 because the number of vehicles associated with source 115*c* is above the minimum threshold. Server computing device 110 may generate aggregate vehicle information (Nt, Vt) based on the information received from vehicle information sources 115*b* and 115*c*. In some embodiments, the aggregate vehicle information may be represented by $$\frac{Vt}{Nt}.$$

FIG. 4B depicts a scenario where the system includes four vehicle information sources 115*a*, 115*b*, 115*c*, 115*d*, of which two vehicle information sources 115*a* and 115*b* are associated with a number of vehicles below the minimum threshold. In this scenario, vehicle information source 115*a* may communicate its information (N1, V1) to vehicle information source 115*b*. Vehicle information source 115*b* may combine the received information with its own information (N2, V2) and communicate the combined information (Nn, Vn) to vehicle information source 115*c*. Vehicle information source 115*c* may further combine the received information with its own information (N3, V3) and communicate the combined information (Nm, Vm) to the server computing device 110. Vehicle information source 115*d* may communicate its information (N4, V4) directly to the server computing device 110 because the number of vehicles associated with source 115*d* is above the minimum threshold. Server computing device 110 may generate aggregate vehicle information based on the information received from vehicle information sources 115*c* and 115*d*. In some embodiments, the aggregate vehicle information may be represented by $$\frac{Vt}{Nt}.$$

FIG. 4C depicts a scenario where all the vehicle information sources 115*a*, 115*b*, 115*c* in the system are associated with a number of vehicles below the minimum threshold. In this scenario, vehicle information source 115*a* may communicate its information to vehicle information source 115*b*, vehicle information source 115*b* may combine the received information with its own information and communicate the combined information to vehicle information source 115*c*, and vehicle information source 115*c* may further combine the received information with its own information and communicate the combined information to the server computing device 110. Server computing device 110 may generate aggregate vehicle information based on the information received from vehicle information source 115*c*. In some embodiments, aggregate vehicle information may be represented by $$\frac{Vt}{Nt}.$$

The inventors have recognized that in such scenarios where a number of vehicles associated with at least one of the vehicle information sources is below the minimum threshold, it may be advantageous to introduce randomness in the data communicated between vehicle information sources 115 and/or between vehicle information sources 115 and the server computing device 110. Introducing randomness can further prevent identity or personal characteristics of vehicle owners to be ascertained from the exchanged data, especially in scenarios where the number of vehicles is below the minimum threshold.

In some embodiments, at least one vehicle information source 115 may add one or more random values to the data it communicates to another vehicle information source. In these embodiments, the at least one vehicle communication source also communicates the one or more random values to the server computing device 110. As shown in FIG. 4C, in some embodiments, vehicle information source 115*a* may add random values (En, Ev) to its information (N1, V1) and communicate the resulting values (N1', V1') to the vehicle information source 115*b*. In these embodiments, the vehicle information source 115*a* may also communicate the random values (En, Ev) to server computing device 110. In some embodiments, the server computing device 110 may generate aggregate vehicle information by removing the random value from the aggregate vehicle information.

One example of the exchange between vehicle information sources 115 and server computing device 110 includes the following steps: (a) server computing device 110 communicates a second query to all vehicle information sources

115; (b) vehicle information sources 115 evaluate their respective sets of vehicle data that match the second query; (c) vehicle information sources 115 communicate their respective values of N to the server computing device 110; (d) server computing device 110 communicates a request to the vehicle information sources 115 to send a sum or average (V) of their respective data sets; and (e) server computing device 110 generates aggregate vehicle information based on the received sums or averages.

In some embodiments, the requests in step (d) may differ depending on the value of N reported by the vehicle information sources. For example, when no source reports N<Min, all vehicle information sources receive a request from the server computing device 110 to send the sum or average of their respective data sets. When one vehicle information source reports N<Min, this vehicle information source receives a request from the server computing device 110 to send its sum or average to a second vehicle information source reporting N>Min. The second vehicle information source receives a request to add its sum or average to the sum or average it receives from the first vehicle information source and send the combined sum or average to the server computing device 110. Other vehicle information sources reporting N>Min receive a request from the server computing device 110 to send the sum or average of their respective data sets directly to the server computing device 110.

When more than one vehicle information source reports N<Min, a first vehicle information source with N<Min receives a request to send its sum or average to the next vehicle information source with N<Min. This is repeated until the last vehicle information source that reported N<Min sends the combined sum or average (obtained by combining the sums or averages associated with all vehicle information sources with N<Min) to a vehicle information source that reported N>Min. This vehicle information source (with N>Min) receives a request to add its sum or average to the sum or average it receives from the vehicle information sources with N<Min and send the combined sum or average to the server computing device 110. Other vehicle information sources reporting N>Min receive a request from the server computing device 110 to send the sum or average of their respective data sets directly to the server computing device 110.

When all vehicle information sources report N<Min, the scenario follows a similar pattern as described immediately above. A first vehicle information source with N<Min receives a request to send its sum or average to the next vehicle information source with N<Min. This is repeated until the last vehicle information source that reported N<Min receives the combined sum or average (obtained by combining the sums or averages associated with all previous vehicle information sources with N<Min). As long as the sum of N across all sources is greater than or equal to the minimum threshold (i.e., sum of all N>=Min), the sums or averages are combined and communicated between the vehicle information sources. The last vehicle information source receives a request to add its sum or average to the sum or average it receives from the previous vehicle information sources with N<Min and send the combined sum or average to the server computing device 110.

In some embodiments, in any of the scenarios described with respect to step (d), at least one vehicle information source 115 may add random values to its sum or average prior to communicating the sum or average to another vehicle information source. While a random value has been described, it will be appreciated that any numeric value may be selected and added to mask the value being exchanged. The value need not be a random value, as aspects of the disclosure are not limited in this respect.

Example Computing Device

Techniques operating according to the principles described herein may be implemented in any suitable manner. Included in the discussion above are a series of flow charts showing the steps and acts of various processes that exchange information, in accordance with queries or requests. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application, for example as a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 506 of FIG. 5 described below (i.e., as a portion of a computing device 500) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 5:
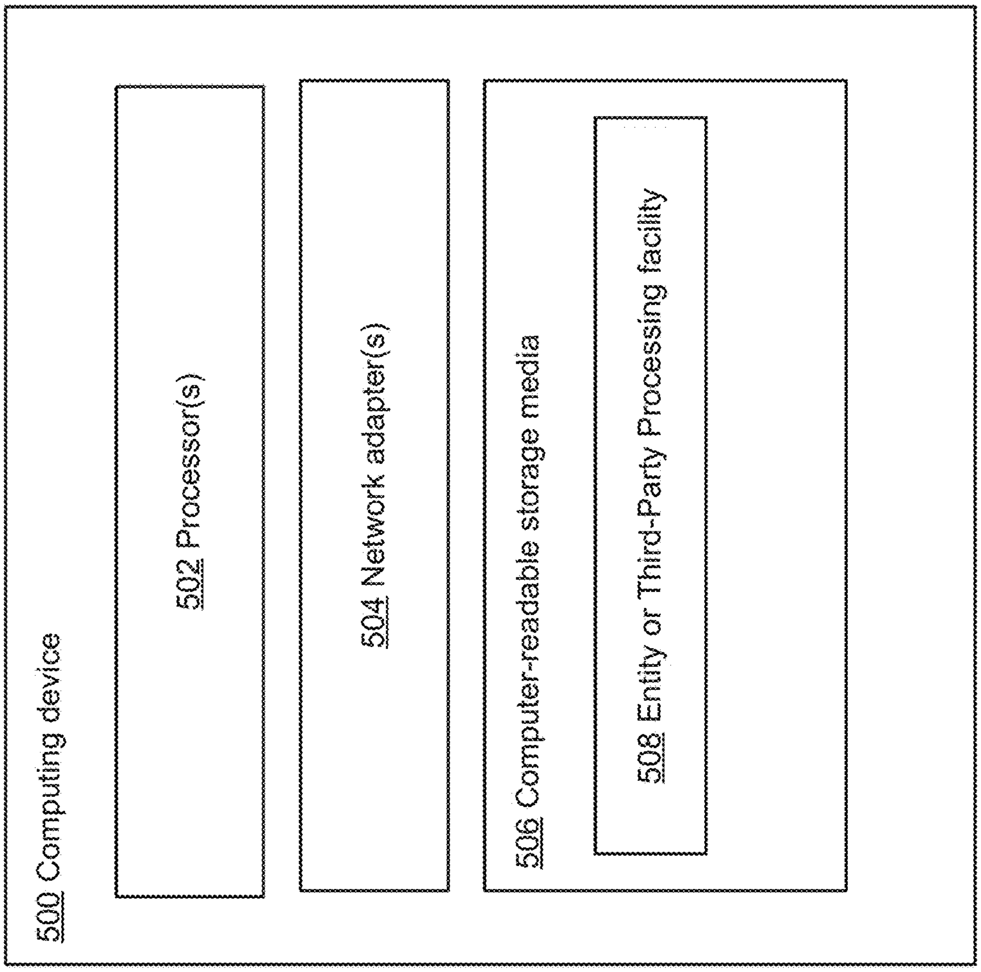
FIG. 5 is a block diagram of an example computing device, according to some embodiments of the technology described herein.

FIG. 5 illustrates one exemplary implementation of a computing device in the form of a computing device 500 that may be used in a system implementing techniques described herein, although others are possible. It should be appreciated that FIG. 5 is intended neither to be a depiction of necessary components for a computing device to operate as a telematics data aggregator and processor or a vehicle information source in accordance with the principles described herein, nor a comprehensive depiction.

Computing device 500 may comprise at least one processor 502, a network adapter 504, and computer-readable storage media 506. Computing device 500 may be, for example, a desktop or laptop personal computer, a personal digital assistant (PDA), a smart mobile phone, a server, or any other suitable computing device. Network adapter 504 may be any suitable hardware and/or software to enable the computing device 500 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 506 may be adapted to store data to be processed and/or instructions to be executed by processor 502. Processor 502 enables processing of data and execution of instructions. The data and instructions may be stored on the computer-readable storage media 506.

The data and instructions stored on computer-readable storage media 506 may comprise computer-executable instructions implementing techniques which operate according to the principles described herein. In the example of FIG. 5, computer-readable storage media 506 stores computer-executable instructions implementing various facilities and storing various information as described above. Computer-readable storage media 506 may store an entity or third-party processing facility 508 that carries out any of the techniques described herein.

While not illustrated in FIG. 5, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, for example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

Use of ordinal terms such as “first,” “second,” “third,” etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of “including,” “comprising,” “having,” “containing”, “involving”, and variations thereof, is meant to encompass the items listed thereafter and additional items.

The word “exemplary” is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for addressing queries regarding vehicles without sharing of individually identifiable information regarding individual vehicles, the system comprising:

a plurality of telematic devices, wherein:

each telematic device is installed in and/or integral to a vehicle of a plurality of vehicles, and each telematics device is configured to:

obtain telematics data relating to the vehicle, the telematics data including individually identifiable information regarding the vehicle, the individually identifiable information including location information regarding the vehicle; and transmit the telematics data to one or more of a plurality of sources of vehicle information;

the plurality of sources of vehicle information, wherein each source of vehicle information comprises at least one first computing device, the at least one first computing device comprising:

at least one first processor; and at least one first storage medium having encoded thereon executable instructions, that when executed by the at least one first processor, cause the at least one first processor to:

receive the telematics data associated with the source; and generate first analysis data resulting from performance of one or more first statistical operations on vehicle information regarding the one or more vehicles associated with the source;

a client device configured to generate a first query requesting first information regarding operation of the plurality of vehicles associated with the plurality of sources of vehicle information, the first query including a request for the first information at a particular location; and at least one second computing device comprising:

at least one second processor; and at least one second storage medium having encoded thereon executable instructions, that when executed by the at least one second processor, cause the at least one second processor to:

receive, from the client device, the first query;

in response to receiving the first query, communicate communicating, to each source of the plurality of sources of vehicle information, a second query requesting second information regarding the one or more vehicles associated with the source of vehicle information, the second query including the particular location and indicating one or more values of interest for a type of information sought about the one or more vehicles;

receive, from each source of the plurality of sources of vehicle information and responsive to the respective second query, the first analysis data, wherein:

each source of vehicle information is configured to generate, using the particular location in the second query and the location information in the telematics data, the first analysis data, and receiving the first analysis data comprises receiving, from each source of the plurality of sources of vehicle information, the first analysis data without receiving individually identifiable information regarding the one or more vehicles associated with the source;

generate aggregate vehicle information at least in part by performing one or more second statistical operations on the first analysis data received from each source of the plurality of sources;

generate a response to the first query based on an analysis of the aggregate vehicle information;

output to the client device the response to the first query, the response comprising the requested first information at the particular location; and perform traffic analysis associated with the particular location based on the response to the first query so that traffic at the particular location may be improved.

2. The system of claim 1, wherein the at least one second processor is further configured to:

communicate, to each source of the plurality of sources of vehicle information, the generated aggregate vehicle information; and receive, from each source of the plurality of sources of vehicle information, second analysis data resulting from performance of one or more third statistical operations on the vehicle information regarding the one or more vehicles associated with the source and the aggregate vehicle information.

3. The system of claim 2, wherein the aggregate vehicle information is first aggregate vehicle information, and the at least one second processor is further configured to:

generate second aggregate vehicle information at least in part by performing one or more fourth statistical operations on the second analysis data received from each source of the plurality of sources.

4. The system of claim 3, wherein outputting to the client device the response to the first query comprises:

outputting to the client device the response to the first query, the response comprising information based on an analysis of the second aggregate vehicle information.

5. The system of claim 1, wherein the at least one second processor is further configured to:

receive, from at least one source of the plurality of sources of vehicle information, at least one random value, wherein the at least one random value is added to the first analysis data resulting from performance of the one or more first statistical operations on the vehicle information, and wherein generating the aggregate vehicle information comprises removing the at least one random value from the aggregate vehicle information.

6. The system of claim 1, wherein the at least one first processor is further configured to:

perform one or more transformation operations on the telematics data, the one or more transformation operations comprising one or more of normalizing the telematics data to represent the telematics data using a data model that is common across the plurality of sources of vehicle information and storing the telematics data using a database schema or structure that is common across the plurality of sources of vehicle information, and perform the one or more first statistical operations using a statistical tool that is common across the plurality of sources of vehicle information.

7. The system of claim 1, wherein the first analysis data resulting from performance of the one or more first statistical operations on the vehicle information regarding the one or more vehicles associated with the source does not include the location information associated with each of the one or more vehicles.

8. The system of claim 1, wherein the at least one second processor of at least one second computing device is not authorized to receive the individually identifiable information regarding the individual vehicles.

* * * * *